(12) United States Patent
Wei et al.

(10) Patent No.: US 12,361,547 B2
(45) Date of Patent: Jul. 15, 2025

(54) DATA PROCESSING METHOD AND APPARATUS, DEVICE AND MEDIUM

(71) Applicant: Tencent Technology (Shenzhen) Company Limited, Shenzhen (CN)

(72) Inventors: Dong Wei, Shenzhen (CN); Yuexiang Li, Shenzhen (CN); Yi Lin, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 401 days.

(21) Appl. No.: 18/075,314

(22) Filed: Dec. 5, 2022

(65) Prior Publication Data
US 2023/0108389 A1 Apr. 6, 2023

Related U.S. Application Data

(63) Continuation of application No. PCT/CN2022/079164, filed on Mar. 4, 2022.

(30) Foreign Application Priority Data

Mar. 10, 2021 (CN) .......................... 202110263415.8

(51) Int. Cl.
*G06V 40/14* (2022.01)
*G06T 7/00* (2017.01)
*G06V 10/774* (2022.01)

(52) U.S. Cl.
CPC .......... *G06T 7/0012* (2013.01); *G06V 10/774* (2022.01); *G06V 40/14* (2022.01);
(Continued)

(58) Field of Classification Search
None
See application file for complete search history.

(56) References Cited

U.S. PATENT DOCUMENTS 11,004,198 B2 * 5/2021 Isgum .................. G06V 20/653
2007/0116332 A1 5/2007 Cai et al.
(Continued)

FOREIGN PATENT DOCUMENTS

CN 106408562 A 2/2017
CN 107292887 A 10/2017
(Continued)

OTHER PUBLICATIONS

Tencent Technology, ISR, PCT/CN2022/079164, May 11, 2022, 3 pgs.
(Continued)

*Primary Examiner* — Tsung Yin Tsai
(74) *Attorney, Agent, or Firm* — Morgan, Lewis & Bockius LLP

(57) ABSTRACT

A data processing method includes: acquiring an initial sample angiography image set; performing data expansion processing on a first sample angiography image based on physical characteristics of blood vessels at a target site to obtain a processed sample angiography image, performing label conversion processing on a first label based on the physical characteristics of the blood vessels at the target site to obtain a second label of the processed sample angiography image, and adding the processed sample angiography image and the second label to a target sample angiography image set; and training an angiography image recognition model using the initial sample angiography image set and the target sample angiography image set to obtain a trained angiography image recognition model. The performance of
(Continued)

the trained angiography image recognition model is improved by increasing the number of samples.

20 Claims, 10 Drawing Sheets

(52) U.S. Cl.
CPC ............... *G06T 2207/20081* (2013.01); *G06T 2207/20221* (2013.01); *G06T 2207/30101* (2013.01)

(56) References Cited

U.S. PATENT DOCUMENTS

| | | | |
|---|---|---|---|
| 2008/0125648 A1* | 5/2008 | Bi | G06V 10/762 378/4 |
| 2014/0100451 A1* | 4/2014 | Tolkowsky | G16H 50/50 600/424 |
| 2014/0121513 A1* | 5/2014 | Tolkowsky | G06T 7/20 600/431 |
| 2017/0261584 A1* | 9/2017 | James | G01R 33/4833 |
| 2018/0000441 A1* | 1/2018 | Wang | G06V 10/755 |
| 2018/0028079 A1* | 2/2018 | Gurevich | A61B 5/7232 |
| 2018/0042566 A1* | 2/2018 | Roffé | A61B 6/4441 |
| 2020/0161005 A1* | 5/2020 | Lyman | G06F 18/2415 |
| 2020/0226422 A1* | 7/2020 | Li | G06F 18/40 |
| 2020/0342587 A1* | 10/2020 | Epperlein | G06V 10/764 |
| 2020/0394789 A1 | 12/2020 | Freund et al. | |
| 2021/0133961 A1* | 5/2021 | Itu | G06N 20/00 |
| 2022/0405915 A1* | 12/2022 | Gordon | G06T 7/10 |
| 2024/0104719 A1* | 3/2024 | Gulsun | G16H 50/20 |

FOREIGN PATENT DOCUMENTS

| | | |
|---|---|---|
| CN | 108629784 A | 10/2018 |
| CN | 109118495 A | 10/2019 |
| CN | 111340789 A | 6/2020 |
| CN | 111445478 A | 7/2020 |
| CN | 111584077 A | 8/2020 |
| CN | 113724186 A | 11/2021 |

OTHER PUBLICATIONS

Tencent Technology, WO, PCT/CN2022/079164, May 11, 2022, 5 pgs.
Tencent Technology, IPRP, PCT/CN2022/079164, Sep. 12, 2023, 6 pgs.
Dan Yang et al., "A Multi-Scale Feature Fusion Method Based on U-Net for Retinal Vessel Segmentation", MDPI.com, Entropy 2020, 22, 811, Jul. 2020, 21 pgs.

* cited by examiner

DATA PROCESSING METHOD AND APPARATUS, DEVICE AND MEDIUM

CROSS-REFERENCE TO RELATED APPLICATIONS

This application is a continuation application of PCT Patent Application No. PCT/CN2022/079164, entitled "DATA PROCESSING METHOD, APPARATUS, AND DEVICE, AND MEDIUM" filed on Mar. 4, 2022, which claims priority to Chinese Patent Application No. 202110263415.8, filed with the State Intellectual Property Office of the People's Republic of China on Mar. 10, 2021, and entitled "DATA PROCESSING METHOD AND APPARATUS, DEVICE, AND MEDIUM", all of which are incorporated herein by reference in their entirety.

FIELD OF THE TECHNOLOGY

This application relates to the field of artificial intelligence technology, and in particular to a computer vision technology.

BACKGROUND OF THE DISCLOSURE

Intracranial aneurysm is a kind of foreign body with a similar shape to a tumor body, which is formed by the long-term impact of blood flow on the wall of the intracranial artery. Latent asymptomatic intracranial aneurysms are not uncommon in the general population, while the mortality rate of subarachnoid hemorrhage caused by rupture of intracranial aneurysms is high (about 50%), and most survivors (up to 46%) may suffer from long-term cognitive impairment, which greatly affects their ability to live and quality of life. Therefore, it is of great significance to predict the rupture risk of intracranial aneurysms.

In practical application, the rupture risk of intracranial aneurysms has a strong correlation with intracranial blood vessels. Specifically, the rupture risk of intracranial aneurysms in intracranial blood vessels can be predicted by recognizing intracranial blood vessels in digital subtraction angiography (DSA) images of intracranial aneurysms. How to recognize intracranial blood vessels in DSA images of intracranial aneurysms is one of the focuses of medical research.

SUMMARY

The embodiments of this application provide a data processing method and apparatus, a device and a medium, which can train a model for recognizing blood vessels included in angiography images, and ensure that the model has good model performance.

One aspect of the embodiment of this application provides a data processing method. The data processing method includes:

acquiring an initial sample angiography image set, the initial sample angiography image set including a first sample angiography image corresponding to a first blood vessel at a target site, and a first label of the first sample angiography image, wherein the first label indicates that the first sample angiography image corresponds to the first blood vessel at the target site;

performing data expansion processing on the first sample angiography image based on physical characteristics of blood vessels at the target site to obtain a processed sample angiography image, performing label conversion processing on the first label based on the physical characteristics of the blood vessels at the target site to obtain a second label of the processed sample angiography image, and adding the processed sample angiography image and the second label to a target sample angiography image set, the second label indicating that the processed sample angiography image corresponds to a second blood vessel at the target site, wherein a region between the first blood vessel and the second blood vessel satisfies the physical characteristics of the blood vessels at the target site; and training an angiography image recognition model using the initial sample angiography image set and the target sample angiography image set to obtain a trained angiography image recognition model, the trained angiography image recognition model identifies a target blood vessel at the target site included in an angiography image.

Another aspect of the embodiment of this application provides a data processing apparatus. The apparatus includes:

an acquisition unit configured to acquire an initial sample angiography image set, the initial sample angiography image set including a first sample angiography image and a first label of the first sample angiography image, the first label indicating that the first sample angiography image corresponds to a first blood vessel at a target site;

a processing unit configured to perform data expansion processing on the first sample angiography image based on physical characteristics of blood vessels at the target site to obtain a processed sample angiography image; perform label conversion processing on the first label based on the physical characteristics of the blood vessels at the target site to obtain a second label of the processed sample angiography image, and add the processed sample angiography image and the second label to a target sample angiography image set, the second label indicating that the processed sample angiography image corresponds to a second blood vessel at the target site, wherein a region between the first blood vessel and the second blood vessel satisfies the physical characteristics of the blood vessels at the target site; and the processing unit being further configured to train an angiography image recognition model using the initial sample angiography image set and the target sample angiography image set to obtain a trained angiography image recognition model, the trained angiography image recognition model being used for identifies a target blood vessel at the target site included in an angiography image.

According to another aspect, an embodiment of this application provides a computer device. The computer device includes:

a processor, configured to run the computer program;
a computer-readable storage medium, the computer-readable storage medium storing a computer program, the computer program, when executed by a processor, implementing the foregoing data processing method.

According to another aspect, an embodiment of this application provides a computer-readable storage medium, storing a computer program, the computer program being loaded and executed by a processor to implement the foregoing data processing method.

According to another aspect, an embodiment of this application provides a computer program product or a computer program, the computer program product or the computer program including computer instructions, the computer instructions being stored in a computer-readable storage medium. A processor of a data processing device reads the computer instructions from the computer-readable storage medium, and executes the computer instructions, to cause the data processing device to perform the foregoing data processing method.

In the embodiment of this application, since the specific blood vessel included in the first sample angiography image is determined before DSA scanning, the annotation information of the first sample angiography image is already contained in the first label of the first sample angiography image, so there is no need to manually annotate the data, thus improving the training efficiency and reducing the workload. Moreover, since the data expansion processing is performed on the sample angiography images in the initial sample angiography image set based on the physical characteristics of the blood vessels at the target site, relatively rich sample angiography images for training the angiography image recognition model can be obtained, thus ensuring that the angiography image recognition model with better performance can be trained through the training process of the angiography image recognition model.

DESCRIPTION OF EMBODIMENTS

DSA images of intracranial aneurysms are different from natural images. DSA images of intracranial aneurysms are three-dimensional medical images. In practice, the parameters of the network model used for processing three-dimensional images (such as three-dimensional deep convolutional neural network) are far more than those of the network model used for processing two-dimensional images. Therefore, for the network model used for processing DSA images of intracranial aneurysms, a large amount of annotation data are often required to train the network model. However, limited by various objective conditions, it is often difficult to obtain a large amount of annotation data. Based on this, the data processing scheme provided in the embodiment of this application may also involve transfer learning and self-supervised pretraining.

Transfer learning is a common technology in the field of natural images to solve the shortage of training data or annotation data. Transfer learning transfers (copies) the pretrained model parameters (using data and labels that are not in the current task) to the new network model to facilitate training. However, the network model parameters pretrained on two-dimensional images or natural video data are not applicable to the model used for processing three-dimensional medical image data such as DSA images of intracranial aneurysms, or the application effect is not ideal.

Self-supervised pretraining can be considered as a variant of transfer learning. Unlike transfer learning, which uses non-current task data and labels to pretrain the parameters of the network model, self-supervised pretraining relies on the agent task defined on the current task data to pretrain, and the agent task itself provides the supervision signal (no additional annotation is required). The research shows that on the basis of the network model obtained through self-supervised pretraining, the network model can achieve satisfactory results with only a small amount of annotation data.

In short, the main implementation principles of the above self-supervised pretraining are as follows: the network model is pretrained based on the agent task (or self-supervised task) with sufficient samples to obtain the pretrained network model. In this process, the agent task provides supervision information. The pretrained network model is trained based on the target task of a small amount of annotation data (that is, the parameters of the pretrained network model are transferred to the new network model, and then the new network model is trained based on a small amount of annotation data) to obtain the trained network model. The self-supervised task is highly correlated with the target task. This can better solve the problem of insufficient annotation data and ensure that the training process of the network model is smooth and the trained network model have better performance.

Figure 1A:
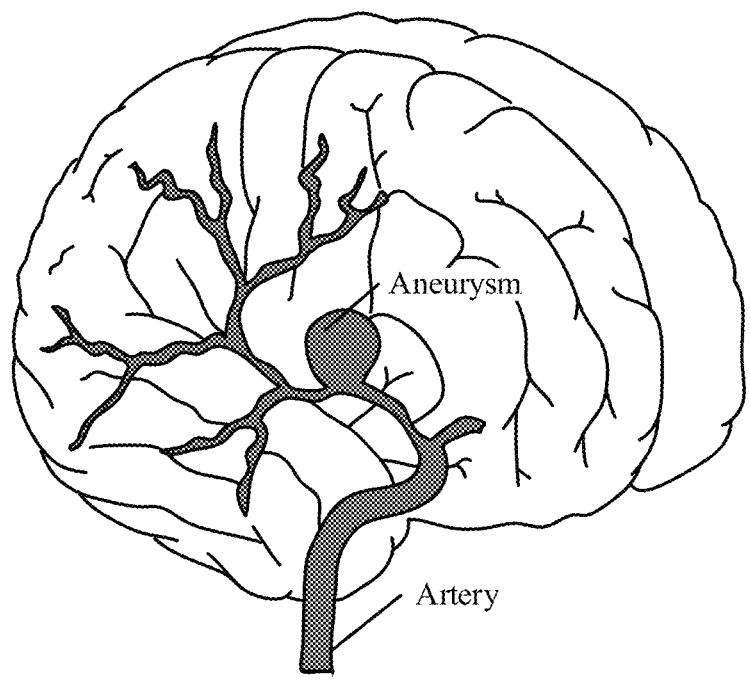
FIG. 1A illustrates a schematic diagram of an intracranial aneurysm according to an embodiment of this application.

Angiography is an auxiliary examination technique of blood vessels. An angiography image of a blood vessel is obtained by injecting a developer (or contrast agent) into the blood vessel and making use of the characteristic that X-ray (that is, an electromagnetic wave, which is often used for auxiliary examination in medicine) cannot penetrate the developer. Common angiography techniques include Digital Subtraction Angiography (DSA), which is the gold standard for the diagnosis of intracranial aneurysms. DSA images of intracranial aneurysms can be obtained by scanning the human brain by using the DSA technique. The so-called intracranial aneurysm (or aneurysm for short) is a foreign body with a similar shape to a tumor body formed by the long-term impact of blood flow on the wall of the intracranial artery. Refer to FIG. 1A for the schematic diagram of the intracranial aneurysm.

Figure 1B:
FIG. 1B illustrates a schematic diagram of a DSA image of an intracranial aneurysm according to an embodiment of this application.

DSA technique is used for acquiring angiography images of intracranial blood vessels, that is, angiography processing of cerebral arterial vessels may include: first, performing local anesthesia in a specific area of a groin; then, inserting a microcatheter into a femoral artery, the catheter going up through an abdominal aorta and other major arteries to reach an arterial vessel of the brain; finally, injecting a contrast agent into the cerebral artery through the catheter to enhance its development, and then acquiring an angiography image through X-ray transmission. The angiography image here is a DSA image of an intracranial aneurysm. Refer to FIG. 1B. The intracranial blood vessel in the angiography image illustrated in FIG. 1B (i.e., the DSA image of the intracranial aneurysm) include two carotid arteries (i.e., the left carotid artery and the right carotid artery) and two vertebral artery vessels (i.e., the left vertebral artery and the right vertebral artery).

Intracranial blood vessels have unique physical characteristics (i.e., clinical imaging characteristics), which include, but not limited to: symmetry (e.g., the left-right symmetry of the human brain), fusing images (e.g., according to multiple angiography images including different intracranial blood vessels, angiography images including multiple intracranial blood vessels can be fused), only one or two arteries included in the DSA image of the intracranial aneurysm, and commonly occurring locations of intracranial aneurysms (for example, aneurysms predisposing to the left carotid artery).

In view of the universality of intracranial aneurysms and the high risk of rupture, early screening of intracranial aneurysms and the formulation of appropriate treatment plans have important clinical value.

As found in actual research, the rupture risk of aneurysms on different intracranial blood vessels is different, that is to say, the rupture risk of aneurysms is related to which intracranial artery it exists in. Based on this, in order to assist doctors to better analyze the rupture risk, rupture time and other information of intracranial aneurysms, so as to help patients treat diseases, DSA images of intracranial aneurysms can be predicted, that is, which intracranial blood vessel is included in the DSA images of intracranial aneurysms can be predicted, and a recognition result of the intracranial blood vessel can be obtained. Then, according to the correlation between intracranial blood vessels and intracranial aneurysms, such as the rupture risk of the intracranial aneurysm on a certain intracranial blood vessel which is high, combined with the recognition result of intracranial blood vessel, doctors are assisted in analyzing the rupture risk and other relevant information of the intracranial aneurysm.

From the above introduction, it can be seen that accurately recognizing an intracranial blood vessel from the DSA image of the intracranial aneurysm is of great significance for the subsequent analysis of the rupture information of the intracranial aneurysm. Based on this, the embodiment of this application proposes a self-supervised training task based on clinical imaging characteristics of DSA images of intracranial aneurysms. The self-supervised training task proposes a task of predicting an intracranial target vessel in the DSA image of the intracranial aneurysm. The data processing scheme proposed in the embodiment of this application is realized by training an angiography image recognition model based on the self-supervised training task.

In addition, the data processing method provided in the embodiments of this application may be performed by a computer device. The computer device may include, but is not limited to terminal devices such as a smart phone, a tablet computer, a laptop computer, and a desktop computer; Or, service devices such as a data processing server, a web server, and an application server. Server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The server herein may be a node server on the blockchain. The terminal device and the server device may be directly or indirectly connected in a wired or wireless communication manner. This is not limited in this application. For convenience of description, description will be made below by taking that a computer device executes the data processing scheme proposed in the embodiment of this application as an example. Here, the executing body of the data processing scheme is described, which, however, does not limit the embodiment of this application.

The specific implementation of the data processing scheme may include: acquiring an initial sample angiography image set, the initial sample angiography image set including a first sample angiography image and a first label of the first sample angiography image; performing data expansion processing on the first sample angiography image based on physical characteristics of blood vessels at a target site (for example, intracranial site) to obtain a processed sample angiography image, performing label conversion processing on the first label based on the physical characteristics of the blood vessels at the target site to obtain a second label of the processed sample angiography image, and adding the processed sample angiography image and the second label to a target sample angiography image set; and training an angiography image recognition model using the initial sample angiography image set and the target sample angiography image set to obtain a trained angiography image recognition model.

In the above process, since the specific blood vessel included in the first sample angiography image is determined before DSA scanning, the annotation information of the first sample angiography image (that is, which vessel is included in the angiography image) is already contained in the first label of the first sample angiography image, so there is no need to manually annotate the data, thus improving the training efficiency and reducing the workload. Moreover, since the data expansion processing is performed on the sample angiography images in the initial sample angiography image set based on the physical characteristics of the blood vessels at the target site, relatively rich sample angiography images for training the angiography image recognition model can be obtained, thus ensuring that the angiography image recognition model with better performance can be trained through the training process of the angiography image recognition model.

Figure 2:
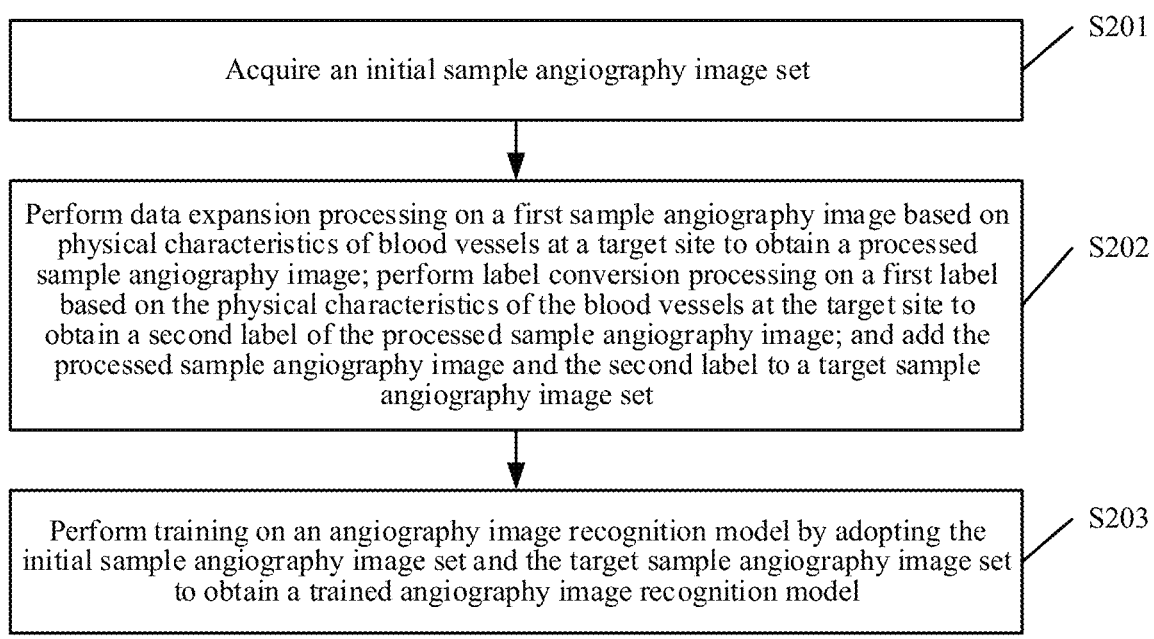
FIG. 2 illustrates a schematic flowchart of a data processing method according to an embodiment of this application.

The data processing scheme proposed by this application will be described in detail below with reference to FIG. 2. FIG. 2 illustrates a schematic flowchart of a data processing method according to an embodiment of this application. The data processing method may be executed by the computer device mentioned above. The scheme includes, but not limited to, steps S201-S203.

In step S201, an initial sample angiography image set is acquired.

The initial sample angiography image set includes a plurality of sample angiography images and a first label of each sample angiography image. The plurality of sample angiography images include a first sample angiography image and a first label of the first sample angiography image. The first label can be used for indicating that the first sample angiography image is obtained by performing angiography processing on a first blood vessel at a target site (for example, intracranial site). In other words, the first label of the first sample angiography image can reflect which blood vessel at the target site the first sample angiography image specifically contains. The first blood vessel at the target site is any one of the blood vessels at the target site. For example, when the target site is the intracranial site, the first intracranial blood vessel may be any one of the intracranial blood vessels. As described above, the intracranial blood vessels include: the left carotid artery, the right carotid artery, the left vertebral artery, and the right vertebral artery. So, the first intracranial blood vessel may be any one of the left carotid artery, the right carotid artery, the left vertebral artery, and the right vertebral artery.

The first sample angiography image may include other blood vessels at the target site in addition to the first blood vessel at the target site. In other words, a frame of angiography image may include a plurality of blood vessels at the target site. If the angiography image is obtained by performing angiography processing on other sites of the human body (such as the chest), the number and type of blood vessels included in the angiography image at this time will be different from those at the above target site, which will not be described in detail here.

Taking that the target site is the intracranial site as an example, the label of the angiography image will be described in detail below. In some embodiments, the label of the angiography image can be expressed as a vector including a plurality of elements, and each element corresponds to an intracranial blood vessel. In a specific implementation, the label of the angiography image can be expressed as a vector y=[y1, y2, y3, y4], where element y1 corresponds to the left carotid artery, element y2 corresponds to the right carotid artery, element y3 corresponds to the left vertebral artery, and element y4 corresponds to the right vertebral artery. When an intracranial blood vessel is included in the angiography image, tan element value corresponding to the intracranial blood vessel is a first element value (such as value 1), otherwise, the element value corresponding to the intracranial blood vessel is a second element value (such as value 0). For example, assuming that the first intracranial blood vessel included in the first sample angiography image is the left carotid artery, in the first label corresponding to the first sample angiography image, an element value (i.e., an element value of element y1) corresponding to the first intracranial blood vessel (i.e., the left carotid artery) may be set as the first element value, and an element value (i.e., element values of element y2, element y3, element y4) corresponding to other intracranial vessels except the first intracranial blood vessel may be set as the second element values. Further, the obtained first label of the first sample angiography image is y=[1, 0, 0, 0], and the first label indicates that the first sample angiography image is obtained by performing angiography processing on the left carotid artery. The position of each element in the vector y=[$y_1$, $y_2$, $y_3$, $y_4$] can be changed. For example, the vector y=[$y_1$, $y_2$, $y_3$, $y_4$] can be expressed as vector y=[$y_1$, $y_2$, $y_3$, $y_4$], etc., which is not limited in the embodiment of this application.

In step S202, data expansion processing is performed on the first sample angiography image based on physical characteristics of blood vessels at the target site to obtain a processed sample angiography image; label conversion processing is performed on the first label based on the physical characteristics of the blood vessels at the target site to obtain a second label of the processed sample angiography image; and the processed sample angiography image and the second label are added to a target sample angiography image set.

Since the blood vessels at the target site have unique physical characteristics of the blood vessels at the target site, in addition to the self-supervised training task mentioned above, the embodiment of this application also supports processing the first sample angiography image and the first label of the first sample angiography image based on the physical characteristics of the blood vessels at the target site, so as to further enrich the tasks and data for training the angiography image recognition model.

Specifically, data expansion processing is performed on the first sample angiography image based on physical characteristics of blood vessels at the target site to obtain a processed sample angiography image, and label conversion processing is performed on the first label based on the physical characteristics of the blood vessels at the target site to obtain a second label of the processed sample angiography image. The second label of the processed sample angiography image is used for indicating that the processed sample angiography image corresponds to (e.g., is obtained by performing angiography processing on) a second blood vessel at the target site. A region between the first blood vessel and the second blood vessel satisfies the physical characteristics of the blood vessels at the target site.

According to the physical characteristics of the blood vessels at different target sites, the data expansion processing of the first sample angiography image and the label conversion processing of the first label will be different. Taking the physical characteristics of two kinds of intracranial blood vessels (i.e., the target site is the intracranial site) as examples, the data expansion processing of the first sample angiography image and the label conversion processing of the first label will be described in detail.

(1) The Physical Characteristics of the Intracranial Blood Vessels Include Symmetry.

Based on the knowledge in the medical field, the human brain is generally left-right symmetrical, and the left-right symmetry of the human brain includes the left-right symmetry of the arteries and blood vessels included in the human brain. For example, there is symmetry between the left carotid artery and the right carotid artery, or there is symmetry between the left vertebral artery and the right vertebral artery. The left-right symmetry here can be understood as: based on the angiography image of the left brain, the angiography image of the right brain of the same human brain can be obtained, and the angiography image of the left brain and the angiography image of the right brain present left-right mirror symmetry.

The implementation of the data expansion processing on the first sample angiography image based on symmetry and the label conversion processing on the first label will be described below.

Figure 3:
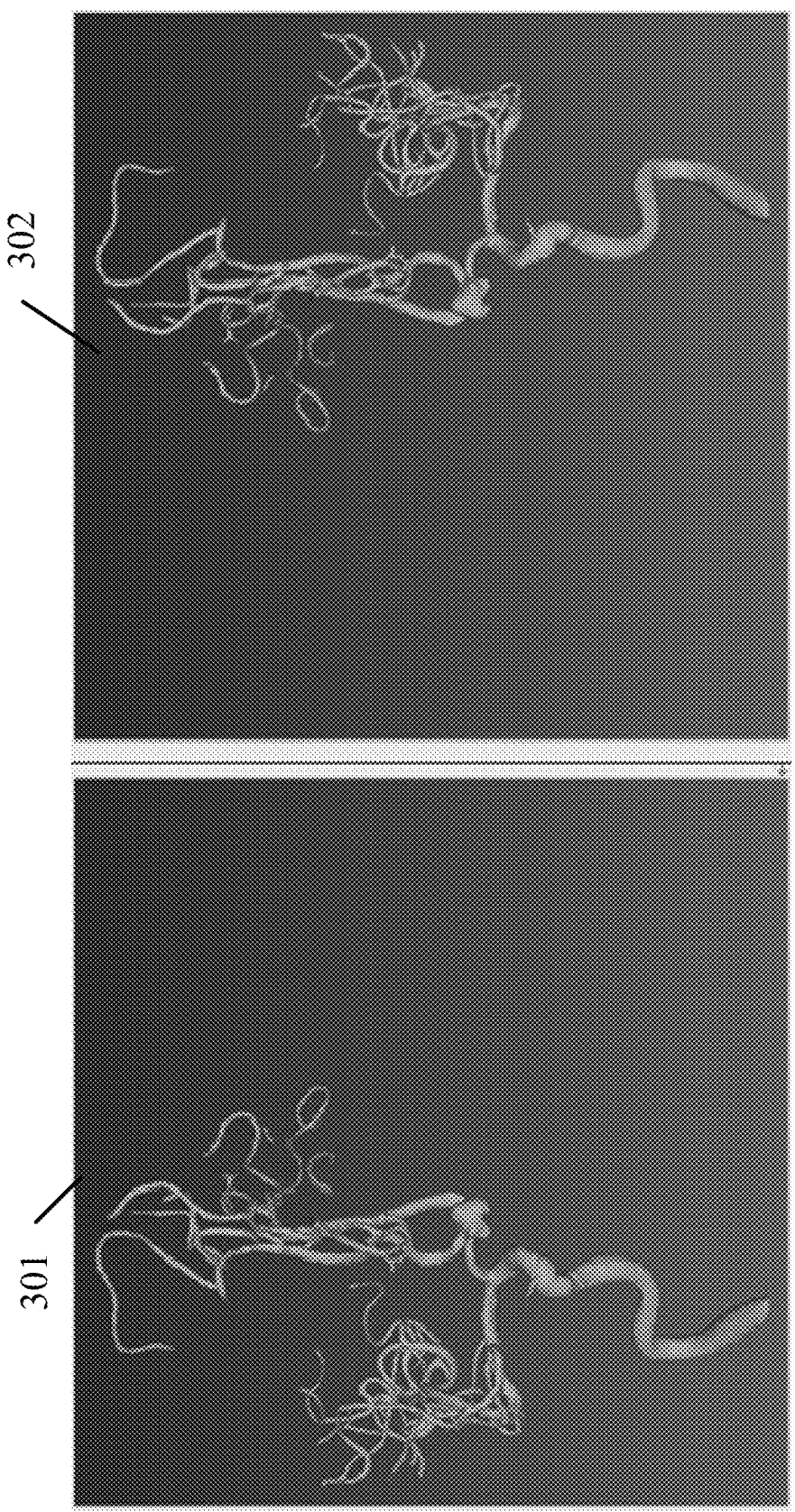
FIG. 3 illustrates a schematic diagram of data expansion processing based on symmetry according to an embodiment of this application.

1) The implementation process of the data expansion processing on the first sample angiography image based on symmetry is as follows: left-right mirror image processing is performed on the first sample angiography image based on the symmetry included in the physical characteristics of the intracranial blood vessels to obtain the processed sample angiography image minor-symmetrical to the first sample angiography image. For example, assuming that an angiography image of a user's left brain is a first sample angiography image 301 illustrated in FIG. 3, an angiography image of a user's right brain as the processed sample angiography image 302 illustrated in FIG. 3 can be obtained by performing left-right mirror image processing on the first sample angiography image 301 based on the symmetry included in the physical characteristics of the intracranial blood vessels. Based on FIG. 3, it can be seen that the first sample angiography image 301 and the processed sample angiography image 302 present left-right mirror symmetry.

2) The implementation process of the label conversion processing on the first label of the first sample angiography image based on symmetry is as follows: first, an element value corresponding to the first intracranial blood vessel in the first label of the first sample angiography image is adjusted from the first element value to the second element value; an element value corresponding to the second intracranial blood vessel in the first label is adjusted from the second element value to the first element value; and finally, the adjusted first label is used as the second label of the processed sample angiography image. Referring to FIG. 3 again, if the first intracranial blood vessel included in the first sample angiography image 301 is a right carotid artery, the label of the first sample angiography image 301 is y=[0, 1, 0, 0]. By adjusting the label of the first sample angiography image 301 according to the above steps, the second label of the processed sample angiography image can be obtained as y=[1, 0, 0, 0], that is, the processed sample angiography image is obtained by performing angiography processing on the left carotid artery (i.e., the second intracranial blood vessel).

To sum up, when data expansion processing is performed on the first sample angiography image through the left-right symmetry of the human brain, the processed sample angiography image corresponding to the first sample angiography image and the second label of the processed sample angiography image can be generated, which can enrich the tasks and data for training and further improve the performance of the angiography image recognition model trained based on the sample angiography images.

(2) The Physical Characteristics of the Intracranial Blood Vessels Include Fusibility.

Fusibility refers to fusing at least two frames of sample angiography images in the initial sample angiography image set to obtain more abundant sample angiography images. The at least two frames of sample angiography images are obtained by performing angiography processing on different intracranial blood vessels. For convenience of description, description will be made by taking two frames of sample angiography images as an example. The two frames of sample angiography images are respectively: a first sample angiography image and a second sample angiography image. The second sample angiography image corresponds to (e.g., is obtained by performing angiography processing on) a third intracranial blood vessel, and the first intracranial blood vessel is different from the third intracranial blood vessel. In other words, the first sample angiography image and the second sample angiography image correspond to (e.g., are obtained by performing angiography processing on) different intracranial blood vessels.

The implementation of the data expansion processing includes fusing the first sample angiography image and the second sample angiography image and the label conversion processing on the first label of the first sample angiography image and the first label of the second sample angiography image will be described below.

Figure 4:
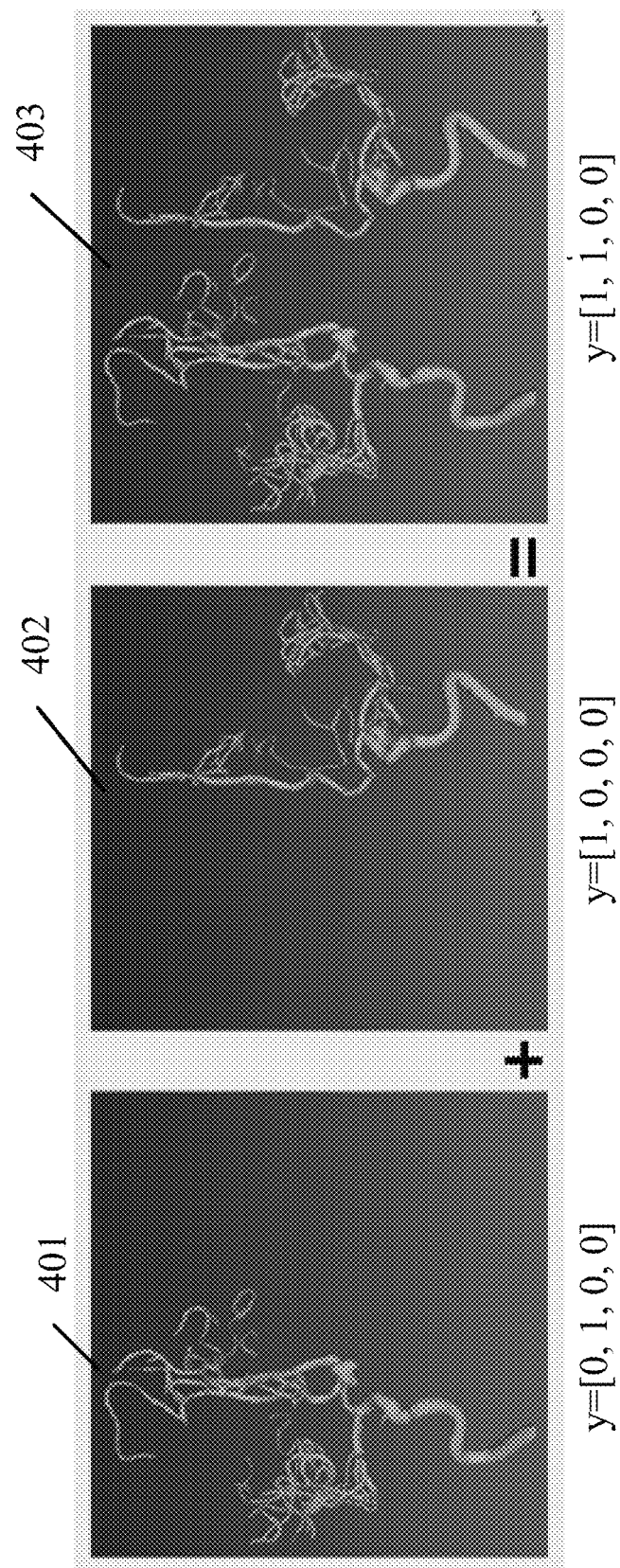
FIG. 4 illustrates a schematic diagram of data expansion processing based on fusing images according to an embodiment of this application.

1) The implementation process of the data expansion processing that includes fusing the first sample angiography image and the second sample angiography image is as follows: fusion processing is performed on the first sample angiography image and the second sample angiography image based on the fusibility included in the physical characteristics of the intracranial blood vessels to obtain a processed sample angiography image. Description will be made with reference to FIG. 4. Assuming that the initial sample angiography image set includes a first sample angiography image 401 and a second sample angiography image 402. Then, fusion processing is performed on the first sample angiography image 401 and the second sample angiography image 402 based on the fusibility included in the physical characteristics of the intracranial blood vessels to obtain a fused sample angiography image 403. It can be seen from FIG. 4 that the processed sample angiography image 403 includes the first sample angiography image 401 and the second sample angiography image 402.

2) The implementation process of the label conversion processing on the first label of the first sample angiography image and the first label of the second sample angiography image based on fusibility is as follows: an element value corresponding to the third intracranial blood vessel in the first label of the first sample angiography image is adjusted to the first element value, and the adjusted first label is determined as a second label of the processed sample angiography image. In other words, first, it is determined that the blood vessel corresponding to the element to which the first element value belongs in the first label of the second sample angiography image is a third intracranial blood vessel; then, an element value corresponding to the third intracranial blood vessel in the first label of the first sample angiography image is adjusted from the second element value to the first element value; finally, the adjusted first label of the first sample angiography image is used as the second label of the processed sample angiography image. For example, referring to FIG. 4 again, assuming that the first intracranial blood vessel included in the first sample angiography image 401 is the right carotid artery, the first label of the first sample angiography image 401 is y=[0, 1, 0, 0]. Assuming that the third intracranial blood vessel included in the second sample angiography image 402 is the left carotid artery, the first label of the second sample angiography image 402 is y=[1, 0, 0, 0]. Fusion processing is performed on the first label y=[0, 1, 0, 0] of the first sample angiography image 401 and the first label y=[1, 0, 0, 0] of the second sample angiography image 402 to obtain a second label y=[1, 1, 0, 0] of the processed sample angiography image 403.

It is to be understood that the above implementation is based on the first label of the first sample angiography image. In other implementations, the label conversion may also be based on the first label of the second sample angiography image, or based on the original label (such as label y=[0, 0, 0, 0]) where the element values of all elements are the second element values, which is not limited in the embodiment of this application.

In addition to the direct fusion described above, other fusion methods can also be used for the fusion of at least two frames of sample angiography images. For example, at least two frames of sample angiography images are respectively subjected to left-right mirror image processing, and then at least two frames of sample angiography images after mirror image processing are fused to obtain a fused sample angiography image. The specific implementation process may include: first, acquiring a blank original image; second, performing left-right mirror image processing on a first sample angiography image so that the blank original image is changed to an image including the processed sample angiography image corresponding to the first sample angiography image; and finally, using the image including the processed angiography image corresponding to the first sample angiography image as the original image, performing left-right mirror image processing on the second sample angiography image to obtain an image including both the processed angiography image corresponding to the first sample angiography image and the processed angiography image corresponding to the second sample angiography image, and using the image as the processed sample angiography image.

In step S203, training an angiography image recognition model by using the initial sample angiography image set and the target sample angiography image set to obtain a trained angiography image recognition model.

The angiography image recognition model may be any one of various common lightweight classification network models, including but not limited to: ResNet18, EfficientNet-B0 and other network models. ResNet18 classification network model is a CNN feature extraction network. EfficientNet-B0 classification network model is a baseline network model. By optimizing the depth, width and input resolution of the EfficientNet-B0 classification network model, the EfficientNet-B0 classification network model can obtain high accuracy, thus ensuring the performance of the EfficientNet-B0 classification network model. The angiography image recognition model can be either of the above two classification network models or other lightweight classification network models. The specific type of the angiography image recognition model is not limited in the embodiment of this application.

In specific implementation, the principle of training the angiography image recognition model by using the initial sample angiography image set and the target sample angiography image set is approximately as follows: first, the angiography image recognition model is called to perform recognition processing on a plurality of sample angiography images in the initial sample angiography image set to obtain a first recognition result corresponding to each of the plurality of sample angiography images in the initial sample angiography image set; the angiography image recognition model is called to perform recognition processing on a plurality of sample angiography images in the target sample angiography image set to obtain a second recognition result corresponding to each of the plurality of sample angiography images in the target sample angiography image set; second, a first loss function of the angiography image recognition model is obtained based on a difference between a plurality of the first recognition results and the first labels corresponding to the corresponding sample angiography images, and a difference between a plurality of the second recognition results and the second labels corresponding to the corresponding sample angiography images; and finally, parameters of the angiography image recognition model are updated based on the first loss function to train the angiography image recognition model.

The embodiment of this application supports the use of binary cross entropy loss to supervise the training of the angiography image recognition model. The binary cross entropy loss function is:

$$\mathcal{L}(y, p) = -\sum_k y_k \log(p_k) + (1 - y_k)\log(1 - p_k)$$

where $\mathcal{L}(y, p)$ is the loss function, $y_k$ is the element value of the kth element in the first label of the sample angiography image, and $p_k$ is the probability that the sample angiography image includes the kth blood vessel.

Determining whether the trained angiography image recognition model meets the training requirements can be implemented by determining whether the loss function meets the training requirements. In an implementation, if a loss value of the loss function is less than a loss threshold in a certain round of training, it can be determined that the angiography image recognition model obtained through training meets the training requirements, and then the training can be ended; if the loss value of the loss function is equal to or greater than the loss threshold in a certain round of training, it can be determined that the trained angiography image recognition model does not meet the training requirements, and the prediction using the currently trained angiography image recognition model is not accurate enough, then it is necessary to continue to adjust the parameters of the angiography image recognition model according to the loss value, so as to optimize the angiography image recognition model, and again train the angiography image recognition model after the previous parameter adjustment using the sample angiography image until the angiography image recognition model meets the training requirements. Different network models may have different loss thresholds, which will not be described in detail here.

In yet another implementation, after a certain round of training, the loss of the loss function is compared with the historical loss value. If the difference between the loss value and the historical loss value is small, it can be determined that the angiography image recognition model obtained through training meets the training requirements, and then the training can be ended. Otherwise, the angiography image recognition model after the previous parameter adjustment is trained again using the sample angiography image until the angiography image recognition model meets the training requirements.

Figure 5:
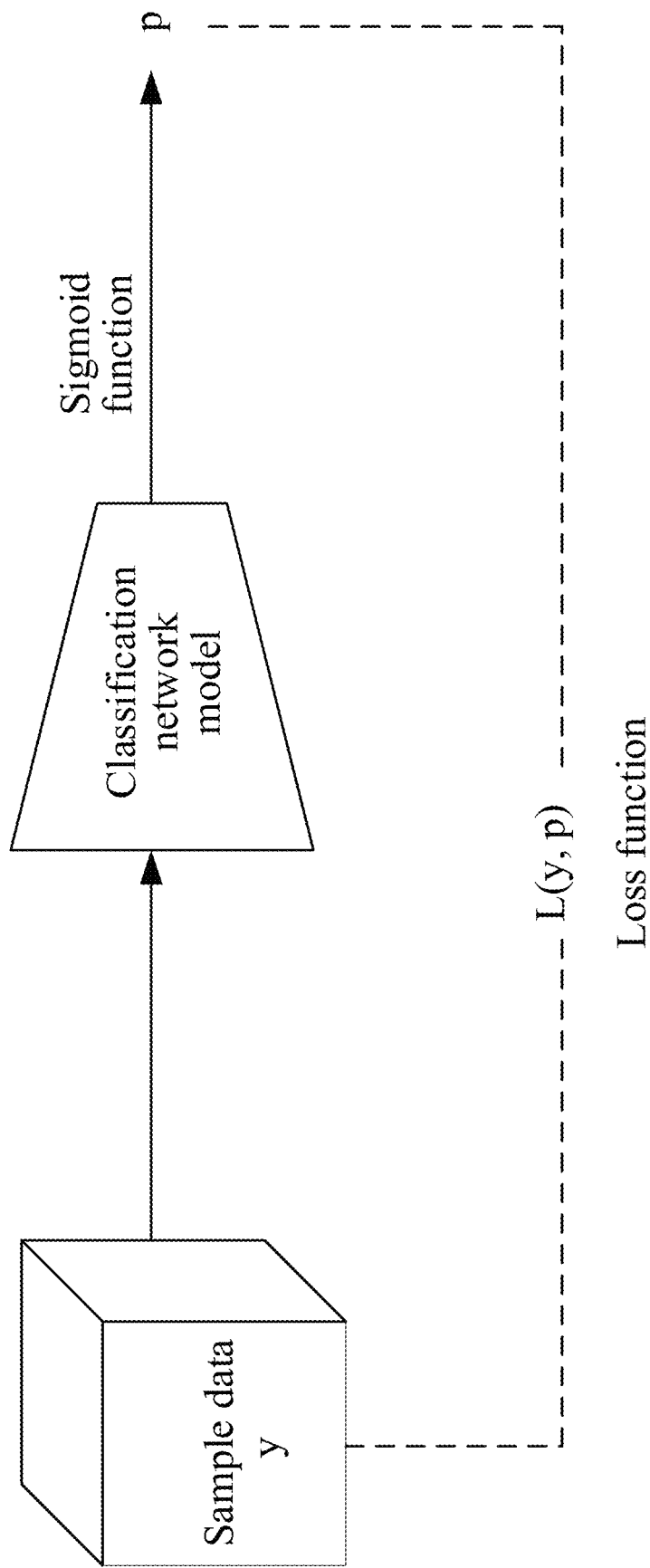
FIG. 5 illustrates a schematic diagram of an angiography image recognition model according to an embodiment of this application.

With reference to FIG. 5, the above training process will be described by taking a sample angiography image as an example to train the angiography image recognition model. In the actual training process, the following steps are included: 1) any sample angiography image in the initial sample angiography image set (or the target sample angiography image set) is taken as an input of the angiography image recognition model. 2) The angiography recognition image model recognizes the probability of each intracranial blood vessel included in the sample angiography image to obtain a recognition result. The probability that each intracranial blood vessel is included in the sample angiography image may be represented by a vector. For example, the vector used for expressing the probability that each intracranial blood vessel is included in the angiography image of the sample is p=[p3, p1, p3, p4], px corresponds to an intracranial blood vessel, for example, p1 corresponds to the left carotid artery, p2 corresponds to the right carotid artery, p3 corresponds to the left vertebral artery, and p4 corresponds to the right vertebral artery. The value of px can be any percentage greater than or equal to 0 and less than or equal to 100%, where x is 1, 2, 3, and 4. For example, the probability that each intracranial blood vessel is included in the sample angiography image can be expressed as p=[0, 100%, 80%, 40%], and this result indicates that the probability of including the left carotid artery is 0, the probability of including the right carotid artery is 100%, the probability of including the left vertebral artery is 80%, and the probability of including the right vertebral artery is 40%. 3) A first loss function of the angiography image recognition model is obtained based on the difference between the recognition result of the sample angiography image and the label corresponding to the sample angiography image. 4) If the first loss function meets the training requirements, the training is ended to obtain the trained angiography image recognition model. If the first loss function does not meet the training requirements, the parameters of the angiography image recognition model are adjusted based on the first loss function, and the above steps 1)-4) are repeated until the first loss function meets the training requirements to obtain the trained angiography image recognition model.

In the embodiment of this application, since the specific blood vessel included in the first sample angiography image is determined before DSA scanning, the annotation information of the first sample angiography image (that is, which vessel is included in the angiography image) is already contained in the first label of the first sample angiography image, so there is no need to manually annotate the data, thus improving the training efficiency and reducing the workload. Moreover, since the data expansion processing is performed on the sample angiography images in the initial sample angiography image set based on the physical characteristics of the blood vessels at the target site, relatively rich sample angiography images for training the angiography image recognition model can be obtained, thus ensuring that the angiography image recognition model with better performance can be trained through the training process of the angiography image recognition model.

As described above, the above-mentioned training process for the angiography image recognition model is implemented based on the self-supervised training task. The trained angiography image recognition model can more accurately recognize the target blood vessel (such as intracranial target blood vessel) at the target site included in any angiography image. In addition, according to the physical characteristics of the blood vessels at the target site (such as commonly occurring locations of intracranial aneurysms, obvious difference in the incidence rate of intracranial aneurysms on different intracranial blood vessels, and correlation between rupture information of intracranial aneurysms and each intracranial blood vessel), this application also supports the proposal of a target task with high correlation with the self-supervised training task based on the self-supervised training task. The target task may include, but not limited to, prediction of rupture information of a target object (such as an intracranial aneurysm) at the target blood vessel at the target site. The rupture information includes rupture risk information of the target object, rupture time information of the target object, and so on. Then, the angiography image recognition model trained by the self-supervised training task is trained again based on the target task to obtain the trained angiography image recognition model. The trained angiography image recognition model can be used for identifying a target blood vessel at the target site in an angiography image and predicting rupture information of a target object on the target blood vessel in any angiography image. In this way, a small amount of sample data including annotation information (that is, information annotating the rupture information of the target object) can be used for training and obtaining an angiography image recognition model for predicting the rupture information of the target object in the target blood vessel in the angiography image, thus improving the performance of the angiography image recognition model in the angiography image analysis task when the annotation information is insufficient, and obtaining the angiography image recognition model with better prediction performance.

The embodiment of this application supports training the angiography image recognition model based on the self-supervised training task and the target task together to obtain the trained angiography image recognition model. The embodiment of this application also supports training the angiography image recognition model based on the self-supervised training task to obtain the trained angiography image recognition model, and then training the trained angiography image recognition model based on the target task to obtain the target angiography image recognition model. The above two training methods will be described below.

(1) The angiography image recognition model is trained based on the self-supervised training task and the target task together to obtain the trained angiography image recognition model.

Figure 6A:
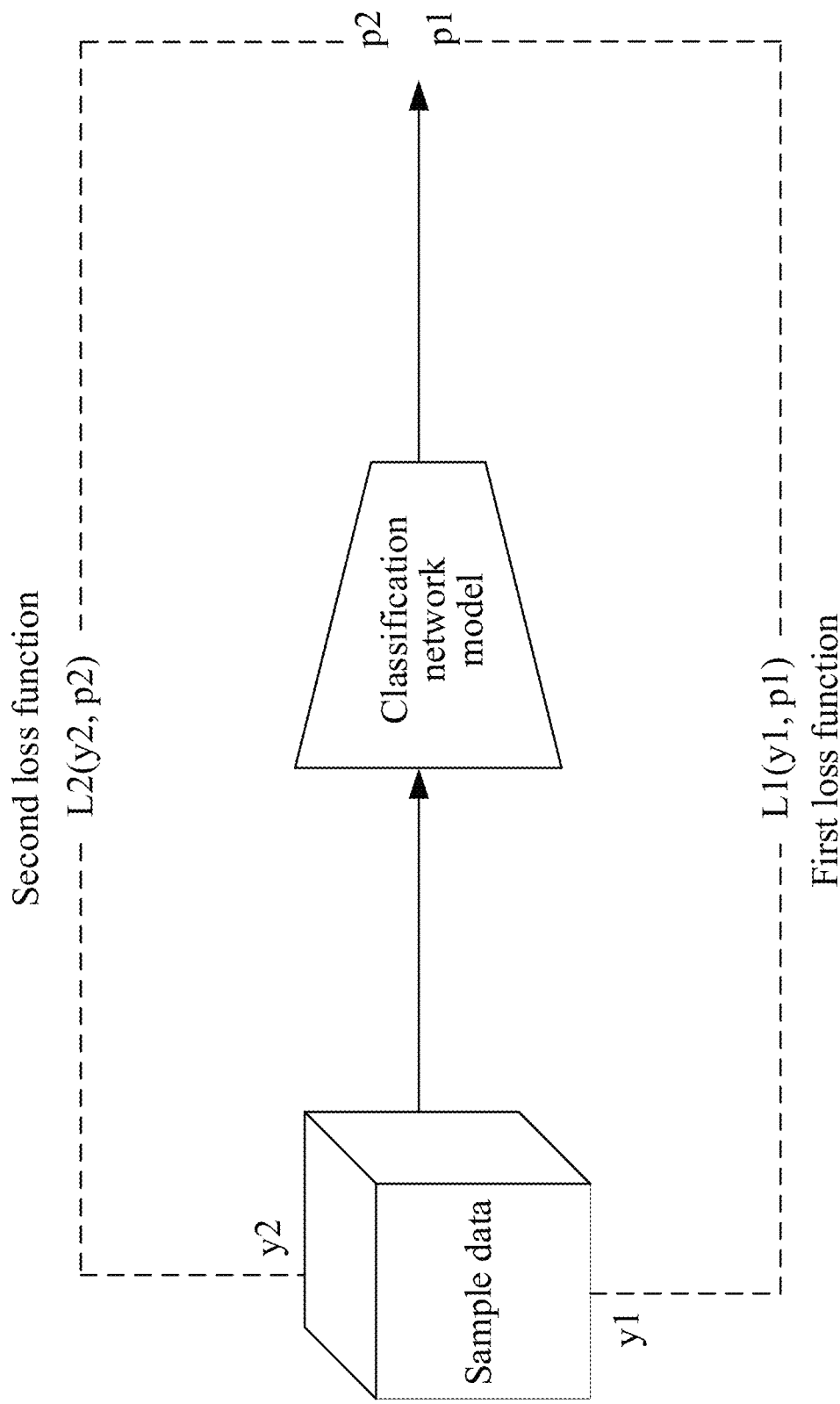
FIG. 6A illustrates a schematic diagram of yet another angiography image recognition model according to an embodiment of this application.
Figure 6B:
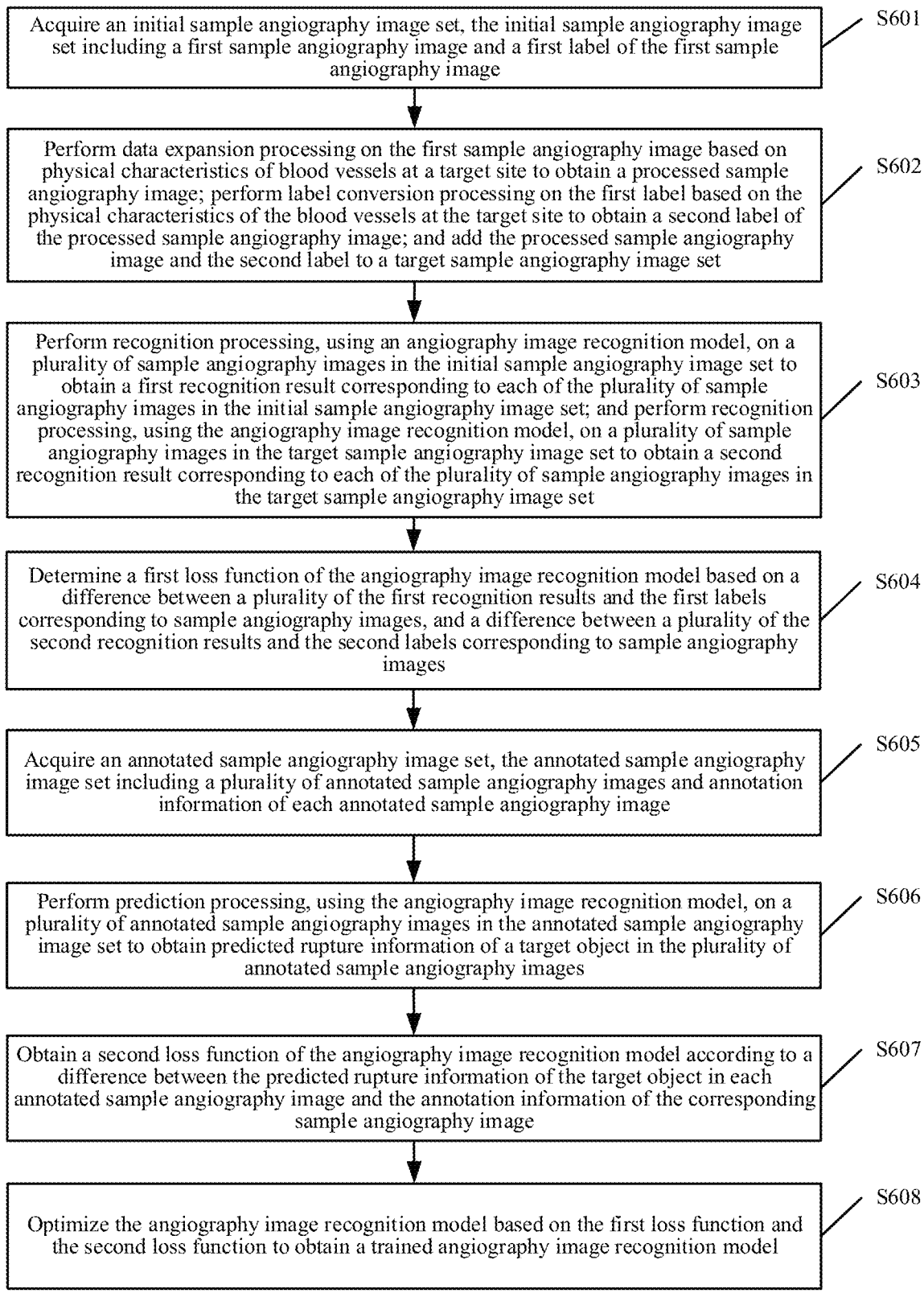
FIG. 6B illustrates a schematic flowchart of yet another data processing method according to an embodiment of this application.

This implementation will be described in detail below with reference to FIG. 6A and FIG. 6B. FIG. 6A illustrates an angiography image recognition model trained based on multiple tasks according to an embodiment of this application. FIG. 6B illustrates a flowchart of a data processing method according to an embodiment of this application. The data processing method may be executed by the computer device mentioned above. The scheme includes, but not limited to, steps S601-S608.

In step S601, an initial sample angiography image set is acquired. The initial sample angiography image set includes a first sample angiography image and a first label of the first sample angiography image.

In step S602, data expansion processing is performed on the first sample angiography image based on physical characteristics of blood vessels at the target site to obtain a processed sample angiography image; label conversion processing is performed on the first label based on the physical characteristics of the blood vessels at the target site to obtain a second label of the processed sample angiography image; and the processed sample angiography image and the second label are added to a target sample angiography image set.

In step S603, the angiography image recognition model is called to perform recognition processing on a plurality of sample angiography images in the initial sample angiography image set to obtain a first recognition result corresponding to each of the plurality of sample angiography images in the initial sample angiography image set; and the angiography image recognition model is called to perform recognition processing on a plurality of sample angiography images in the target sample angiography image set to obtain a second recognition result corresponding to each of the plurality of sample angiography images in the target sample angiography image set.

In step S604, a first loss function of the angiography image recognition model is obtained based on a difference between a plurality of the first recognition results and the first labels corresponding to the corresponding sample angiography images, and a difference between a plurality of the second recognition results and the second labels corresponding to the corresponding sample angiography images.

For the specific implementation process of steps S601-S604, a reference can be made to the relevant description of the specific implementation process of steps S201-S203 in the embodiment illustrated in FIG. 2, which will not be repeated here.

In step S605, an annotated sample angiography image set is acquired. The annotated sample angiography image set includes a plurality of annotated sample angiography images and annotation information of each annotated sample angiography image.

The annotation information of the annotated sample angiography image is used for indicating rupture information of a target object (such as intracranial aneurysm) included in a fourth blood vessel at the target site in the annotated sample angiography image, and the rupture information includes at least one of rupture risk information of the target object and rupture time information of the target object.

In step S606, the angiography image recognition model is called to perform prediction processing on a plurality of annotated sample angiography images in the annotated sample angiography image set to obtain predicted rupture information of the target object in the plurality of annotated sample angiography images.

The expression form of the predicted rupture information of the target object may be different depending on the target task. For example, if the target task is to predict the rupture risk information of the target object in the intracranial blood vessel, the predicted rupture information of the target object can be expressed in the form of percentage, decimal, etc. For another example, if the target task is to predict the rupture time of the target object in the intracranial blood vessel, the predicted rupture information of the target object can be expressed as a time period (such as 24 hours) or time (such as 12:00).

In step S607, a second loss function of the angiography image recognition model is obtained according to a difference between the predicted rupture information of the target object in each annotated sample angiography image and the annotation information of the corresponding sample angiography image.

Similar to the first loss function, the embodiment of this application can also use binary cross entropy loss to supervise the training of the angiography image recognition model based on the target task, which will not be repeated here.

In step S608, the angiography image recognition model is optimized based on the first loss function and the second loss function to obtain the trained angiography image recognition model.

The angiography image recognition model optimized based on the first loss function and the second loss function can be used for identifying the target blood vessel at the target site in any angiography image and predicting the rupture information of the target object in any angiography image.

As an optional embodiment, the implementation of optimizing the angiography image recognition model based on the first loss function and the second loss function may include: performing weighting processing on the first loss function and the second loss function to obtain a third loss function; and updating parameters of the angiography image recognition model based on the third loss function to train the angiography image recognition model. For example, if the first loss function is L1, the second loss function is L2, the weighting coefficient of the first loss function L1 is a and the weighting coefficient of the second loss function L2 is b, then the third loss function $L3=a*L1+b*L2$.

(2) The angiography image recognition model is first trained based on the self-supervised training task to obtain the trained angiography image recognition model, and then the trained angiography image recognition model is trained based on the target task to obtain the target angiography image recognition model.

Figure 7:
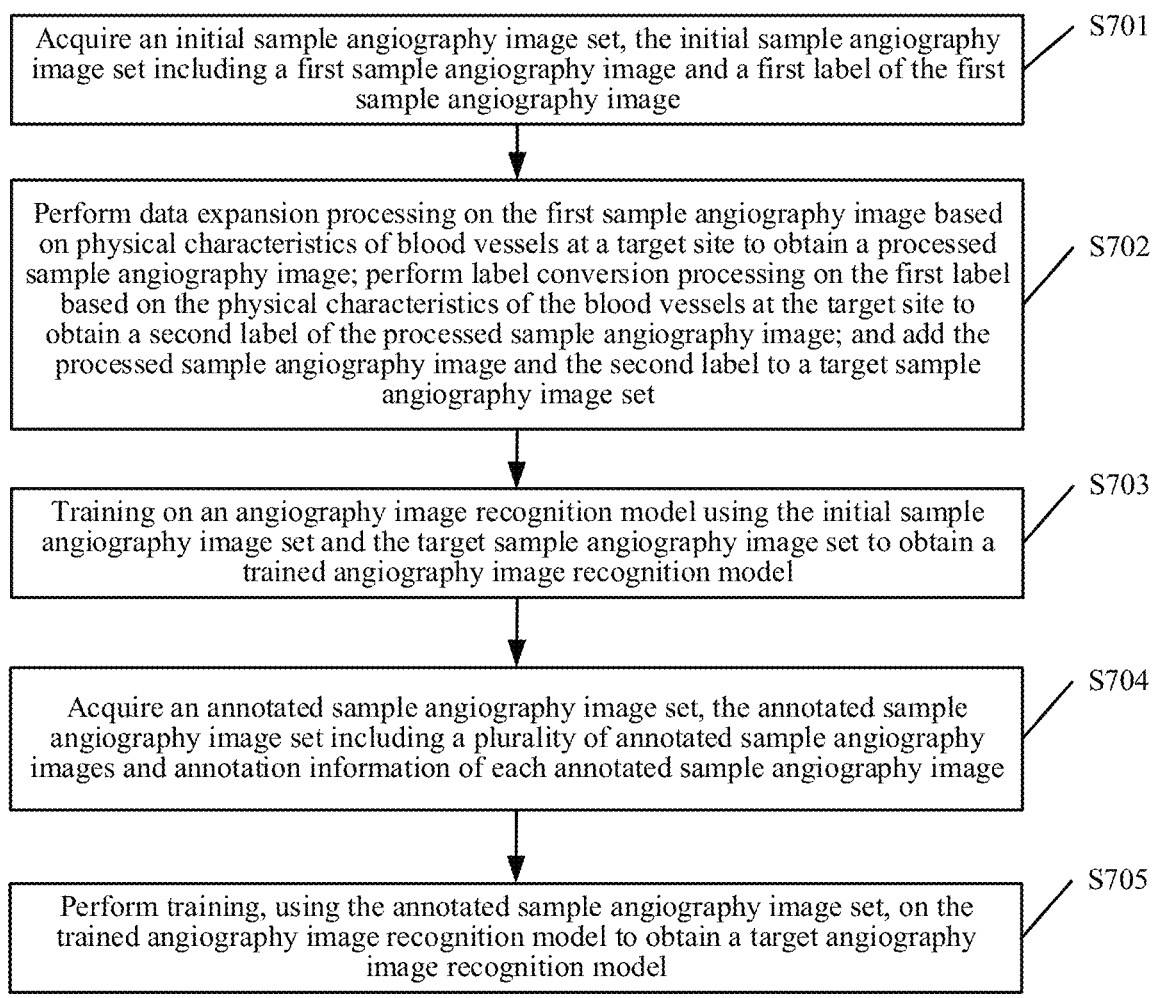
FIG. 7 illustrates a schematic flowchart of yet another data processing method according to an embodiment of this application.

This implementation will be described in detail below with reference to FIG. 7. FIG. 7 illustrates a schematic flowchart of a data processing method according to an embodiment of this application. The data processing method may be executed by the computer device mentioned above. The scheme includes, but not limited to, steps S701-S705.

In step S701, an initial sample angiography image set is acquired. The initial sample angiography image set includes a first sample angiography image and a first label of the first sample angiography image.

In step S702, data expansion processing is performed on the first sample angiography image based on physical characteristics of blood vessels at the target site to obtain a processed sample angiography image; label conversion processing is performed on the first label based on the physical characteristics of the blood vessels at the target site to obtain a second label of the processed sample angiography image; and the processed sample angiography image and the second label are added to a target sample angiography image set.

In step S703, training an angiography image recognition model using the initial sample angiography image set and the target sample angiography image set to obtain a trained angiography image recognition model.

In step S704, an annotated sample angiography image set is acquired. The annotated sample angiography image set includes a plurality of annotated sample angiography images and annotation information of each annotated sample angiography image.

For the specific implementation process of steps S701-S703, please refer to the relevant description of the specific implementation process in steps S201-S203 in the embodiment illustrated in FIG. 2, and for the specific implementation process of step S704, please refer to the relevant description of the specific implementation process in step S605 in the embodiment illustrated in FIG. 6B.

In step S705, the annotated sample angiography image set is called to perform training on the trained angiography image recognition model to obtain a target angiography image recognition model.

The process of calling the annotated sample angiography image set to perform training on the trained angiography image recognition model (i.e., the angiography image recognition model trained based on the self-supervised training task) is similar to the above described process of calling the initial sample angiography image set and the target sample angiography image set to perform training on the angiography image recognition model. Brief description will be made here. The trained angiography image recognition model is called to perform recognition processing on a plurality of annotated sample angiography images in the annotated sample angiography image set to obtain a predicted rupture result corresponding to each of the plurality of annotated sample angiography images in the annotated sample angiography image set. A fourth loss function of the angiography image recognition model is obtained according to a difference between the predicted rupture information corresponding to each of the plurality of annotated sample angiography images and the annotation information corresponding to the corresponding annotated sample angiography image. Parameters of the trained angiography image recognition model are adjusted based on the fourth loss function to train the target angiography image recognition model. The trained target angiography image recognition model can be used for identifying a target blood vessel at the target site in any angiography image and predicting rupture information of a target object in the target blood vessel in any angiography image.

To sum up, since the annotation information of the sample angiography image during self-supervised training is already contained in the label of the sample angiography image, the angiography image recognition model that meets the self-supervised training task can be obtained without performing manual annotation. Moreover, since the self-supervised training task has a high correlation with the target task, a target contrast image recognition model meeting the target task can be obtained and the performance of the angiography image recognition model trained based on a small number of annotated samples can be ensured. In addition, the angiography image recognition model is trained based on the self-supervised training task and the target task at the same time, so that the target angiography image recognition model not only recognizes the target blood vessel at the target site in the angiography image but also predicts the rupture information of the target object in the target blood vessel at the same time during training, thus improving the training efficiency and speed.

Figure 8:
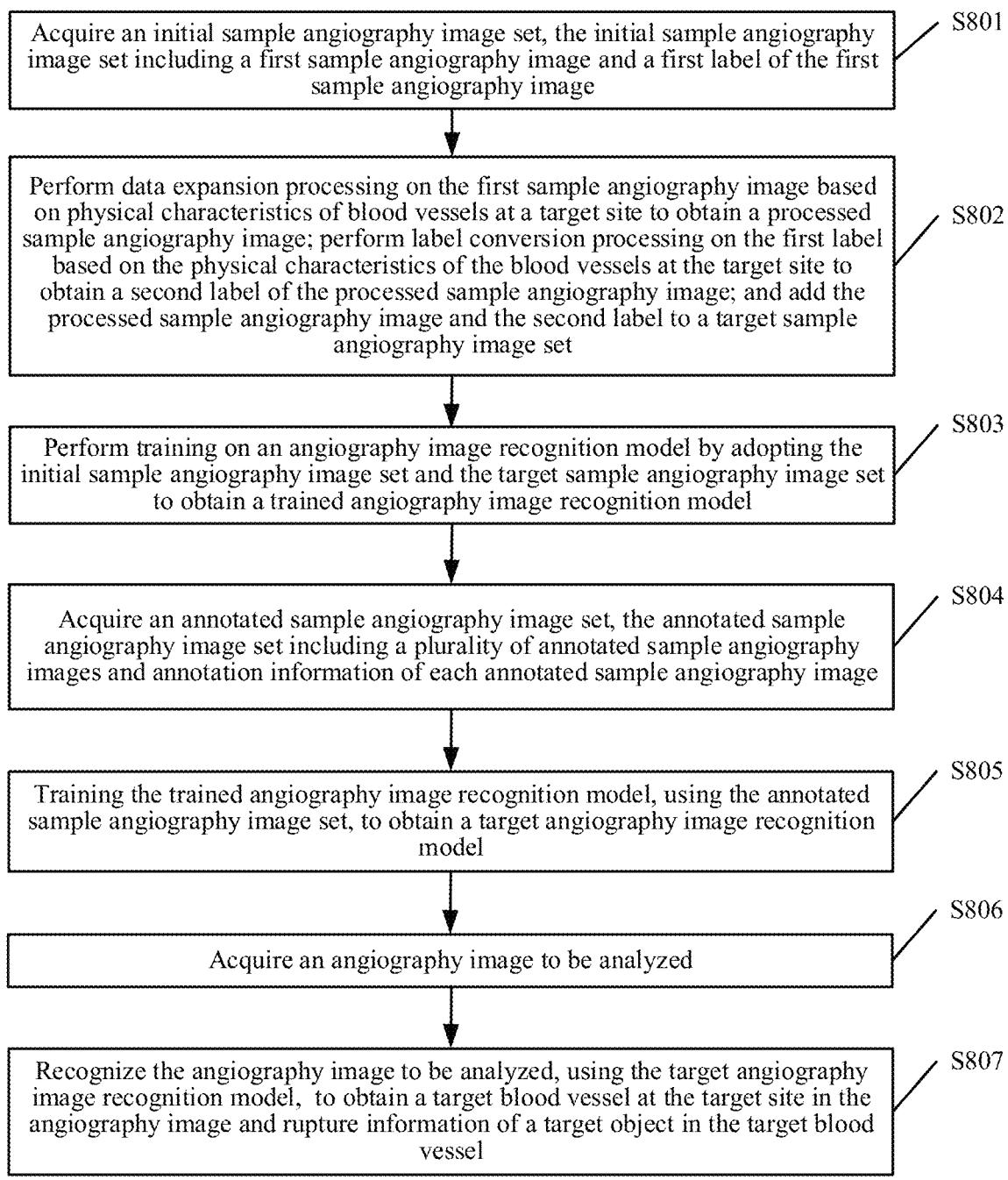
FIG. 8 illustrates a schematic flowchart of yet another data processing method according to an embodiment of this application.

Please refer to FIG. 8, and FIG. 8 illustrates a schematic flowchart of yet another data processing method according to an embodiment of this application. The data processing method may be executed by the computer device mentioned above. The data processing method may include steps S801-S807.

In step S801, an initial sample angiography image set is acquired. The initial sample angiography image set includes a first sample angiography image and a first label of the first sample angiography image.

In step S802, data expansion processing is performed on the first sample angiography image based on physical characteristics of blood vessels at the target site to obtain a processed sample angiography image; label conversion processing is performed on the first label based on the physical characteristics of the blood vessels at the target site to obtain a second label of the processed sample angiography image; and the processed sample angiography image and the second label are added to a target sample angiography image set.

In step S803, training an angiography image recognition model using the initial sample angiography image set and the target sample angiography image set to obtain a trained angiography image recognition model.

In step S804, an annotated sample angiography image set is acquired. The annotated sample angiography image set includes a plurality of annotated sample angiography images and annotation information of each annotated sample angiography image.

In step S805, the annotated sample angiography image set is called to perform training on the trained angiography image recognition model to obtain a target angiography image recognition model.

For the specific implementation process of steps S801-S805, a reference can be made to the relevant description of the specific implementation process of steps S701-S705 in the embodiment illustrated in FIG. 7, which will not be repeated here.

In step S806, an angiography image to be analyzed is acquired.

In step S807, the target angiography image recognition model is called to recognize the angiography image to be analyzed to obtain a target blood vessel at the target site in the angiography image and rupture information of a target object in the target blood vessel.

In the embodiment of this application, the data expansion processing can be performed on the sample angiography images in the initial sample angiography image set based on the physical characteristics of the blood vessels at the target site, relatively rich sample angiography images for training the angiography image recognition model can be obtained, and thus the angiography image recognition model with better performance can be obtained. The angiography image recognition model can effectively recognize the target blood vessel at the target site in the angiography image (such as DSA image of intracranial aneurysm) and predict the rupture information of the target object in the target blood vessels, which has important clinical significance.

The method in the embodiments of the present invention is described in detail above. For ease of better implementing the foregoing solutions in the embodiments of the present invention, an apparatus in an embodiment of the present invention is correspondingly provided in the following.

Figure 9:
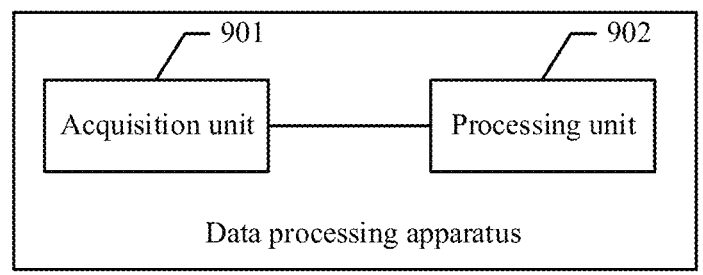
FIG. 9 illustrates a schematic structural diagram of a data processing apparatus according to an embodiment of this application.

FIG. 9 illustrates a schematic structural diagram of a data processing apparatus according to an embodiment of this application. The data processing apparatus may be used for a computer program (including program code) running in a terminal. The data processing apparatus can be used for performing some or all of the steps in the method embodiments illustrated in FIG. 2, FIG. 6B, FIG. 7, and FIG. 8. Referring to FIG. 9, the data processing apparatus includes the following units:

an acquisition unit 901 configured to acquire an initial sample angiography image set, the initial sample angiography image set including a first sample angiography image and a first label of the first sample angiography image, the first label indicating that the first sample angiography image corresponds to (e.g., is obtained by performing angiography processing on) a first blood vessel at a target site;

a processing unit 902 configured to perform data expansion processing on the first sample angiography image based on physical characteristics of blood vessels at the target site to obtain a processed sample angiography image; perform label conversion processing on the first label based on the physical characteristics of the blood vessels at the target site to obtain a second label of the processed sample angiography image; and add the processed sample angiography image and the second label to a target sample angiography image set; the second label indicating that the processed sample angiography image corresponds to a second blood vessel at the target site, wherein a region between the first blood vessel and the second blood vessel satisfies the physical characteristics of the blood vessels at the target site; and the processing unit 902 being further configured to train an angiography image recognition model using the initial sample angiography image set and the target sample angiography image set to obtain a trained angiography image recognition model, the trained angiography image recognition model being used for identifies a target blood vessel at the target site included in an angiography image.

In an implementation, the physical characteristics of the blood vessels at the target site include symmetry; when performing data expansion processing on the first sample angiography image based on physical characteristics of blood vessels at the target site to obtain a processed sample angiography image, the processing unit 902 is specifically configured to:

perform left-right mirror image processing on the first sample angiography image based on the symmetry included in the physical characteristics of the blood vessels at the target site to obtain the processed sample angiography image symmetrical to the first sample angiography image.

In an implementation, the first blood vessel is any one of the blood vessels at the target site, a label of an angiography image is a vector including a plurality of elements, and each element is used for characterizing a possibility that one blood vessel is included in the angiography image;

in the first label of the first sample angiography image, an element value corresponding to the first blood vessel is a first element value, and an element value corresponding to other blood vessels at the target site other than the first blood vessel is a second element value.

In an implementation, when performing label conversion processing on the first label based on the physical characteristics of the blood vessels at the target site to obtain a second label of the processed sample angiography image, the processing unit 902 is specifically configured to:

adjust the element value corresponding to the first blood vessel in the first label from the first element value to the second element value; adjust the element value corresponding to the second blood vessel in the first label from the second element value to the first element value; and use the adjusted first label as the second label of the processed sample angiography image.

In an implementation, the initial sample angiography image set further includes a second sample angiography image, the second sample angiography image corresponds to a third blood vessel at the target site, and the first blood vessel is different from the third blood vessel; the physical characteristics of the blood vessels at the target site include fusibility; and when performing data expansion processing on the first sample angiography image based on physical characteristics of blood vessels at the target site to obtain a processed sample angiography image, the processing unit 902 is specifically configured to:

perform fusion processing on the first sample angiography image and the second sample angiography image based on the fusibility included in the physical characteristics of the blood vessels at the target site to obtain the processed sample angiography image.

In an implementation, when performing label conversion processing on the first label based on the physical characteristics of the blood vessels at the target site to obtain a second label of the processed sample angiography image, the processing unit 902 is specifically configured to:

adjust the element value corresponding to the third blood vessel at the target site in the first label to the first element value; and determine the adjusted first label as the second label of the processed sample angiography image.

In an implementation, when training an angiography image recognition model using the initial sample angiography image set and the target sample angiography image set to obtain a trained angiography image recognition model, the processing unit 902 is specifically configured to:

call the angiography image recognition model to perform recognition processing on a plurality of sample angiography images in the initial sample angiography image set to obtain a first recognition result corresponding to each of the plurality of sample angiography images in the initial sample angiography image set;

call the angiography image recognition model to perform recognition processing on a plurality of sample angiography images in the target sample angiography image set to obtain a second recognition result corresponding to each of the plurality of sample angiography images in the target sample angiography image set;

determine a first loss function of the angiography image recognition model based on a difference between a plurality of the first recognition results and the first labels corresponding to the corresponding sample angiography images, and a difference between a plurality of the second recognition results and the second labels corresponding to the corresponding sample angiography images; and update parameters of the angiography image recognition model based on the first loss function to train the angiography image recognition model.

In an implementation, when updating the parameters of the angiography image recognition model based on the third loss function, the processing unit 902 is specifically configured to:

acquire an annotated sample angiography image set, the annotated sample angiography image set including a plurality of annotated sample angiography images and annotation information of each annotated sample angiography image, the annotation information of the annotated sample angiography image indicating rupture information of a target object included in a fourth blood vessel at the target site in the annotated sample angiography image, the rupture information including at least one of rupture risk information of the target object and rupture time information of the target object;

call the angiography image recognition model to perform prediction processing on a plurality of annotated sample angiography images in the annotated sample angiography image set to obtain predicted rupture information of the target object in the plurality of annotated sample angiography images;

determine a second loss function of the angiography image recognition model according to a difference between the predicted rupture information of the target object in each annotated sample angiography image and the annotation information of the corresponding annotated sample angiography image; and optimize the angiography image recognition model based on the first loss function and the second loss function to obtain the trained angiography image recognition model, the trained angiography image recognition model is used for identifying a target blood vessel at the target site in an angiography image and predicting rupture information of a target object in the target blood vessel in the angiography image.

In an implementation, when optimizing the angiography image recognition model based on the first loss function and the second loss function, the processing unit 902 is specifically configured to:

perform weighting processing on the first loss function and the second loss function to obtain a third loss function; and update the parameters of the angiography image recognition model based on the third loss function.

In an implementation, the processing unit 902 is further configured to:

acquire an annotated sample angiography image set, the annotated sample angiography image set including a plurality of annotated sample angiography images and annotation information of each annotated sample angiography image, the annotation information of the annotated sample angiography image indicating rupture information of a target object included in a fourth blood vessel at the target site in the annotated sample angiography image, the rupture information including at least one of rupture risk information of the target object and rupture time information of the target object;

call the annotated sample angiography image set to perform training on the trained angiography image recognition model to obtain a target angiography image recognition model, the target angiography image recognition model being used for identifies a target blood vessel at the target site included in an angiography image and rupture information of a target object in the target blood vessel at the target site.

In an implementation, the processing unit 902 is further configured to:

acquire an angiography image to be analyzed;

call the trained angiography image recognition model or the target angiography image recognition model to perform recognition processing on the angiography image to be analyzed to obtain a target blood vessel at the target site in the angiography image and rupture information of a target object in the target blood vessel.

According to another embodiment of this application, units of the system for data processing apparatus shown in FIG. 9 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the data processing apparatus may also include other units. In an actual application, the functions may also be cooperatively implemented by other units and may be cooperatively implemented by a plurality of units. According to another embodiment of this application, a computer program (including program code) that can perform the steps in the corresponding method shown in FIG. 2, FIG. 6B, FIG. 7, and FIG. 8 may be run on a general computing device, such as a computer, which includes processing elements and storage elements such as a central processing unit (CPU), a random access memory (RAM), and a read-only memory (ROM), to construct the data processing apparatus shown in FIG. 9 and implement the data processing method in the embodiments of this application. The computer program may be recorded in, for example, a computer readable recording medium, and may be loaded into the foregoing computing device by using the computer readable recording medium, and run in the computing device.

In the embodiment of this application, since the specific blood vessel included in the first sample angiography image is determined before DSA scanning, the annotation information of the first sample angiography image is already contained in the first label of the first sample angiography image, so there is no need to manually annotate the data, thus improving the training efficiency and reducing the workload. Moreover, since the processing unit 902 performs the data expansion processing on the sample angiography images in the initial sample angiography image set based on the physical characteristics of the blood vessels at the target site, relatively rich sample angiography images for training the angiography image recognition model can be obtained, thus ensuring that the angiography image recognition model with better performance can be trained through the training process of the angiography image recognition model.

Figure 10:
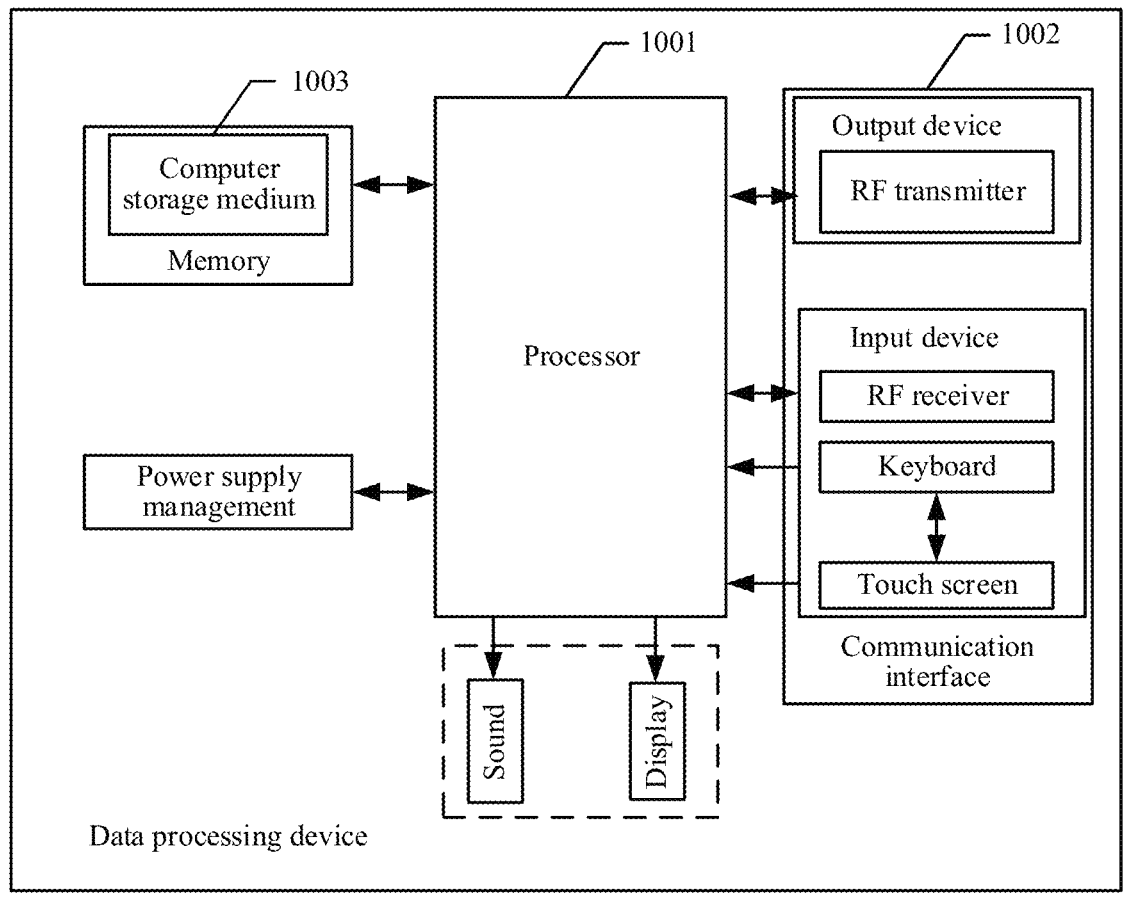
FIG. 10 illustrates a schematic structural diagram of a data processing device according to an embodiment of this application.

FIG. 10 illustrates a schematic structural diagram of a data processing device according to an exemplary embodiment of this application. Referring to FIG. 10, the data processing device includes a processor 1001, a communication interface 1002, and a computer-readable storage medium 1003. The processor 1001, the communication interface 1002, and the computer-readable storage medium 1003 may be connected by a bus or in another manner. The communications interface 1002 is configured to receive and transmit the data. The computer-readable storage medium 1003 may be stored in a memory of the terminal. The computer-readable storage medium 1003 is configured to store a computer program. The computer program includes program instructions. The processor 801 is configured to execute the program instructions stored in the computer-readable storage medium 1003. The processor 1001 (or referred to as a central processing unit (CPU)) is a computing core and a control core of the terminal, is suitable for implementing one or more instructions, and is specifically suitable for loading and executing the one or more instructions to implement a corresponding method procedure or a corresponding function.

An embodiment of this application further provides a computer storage medium. The computer-readable storage medium is a memory device in a terminal and is configured to store programs and data. As can be understood, the computer-readable storage medium herein may include an internal storage medium of the terminal and may further include an extended storage medium supported by the terminal. The computer-readable storage medium provides storage space, and the storage space stores a processing system of the terminal. In addition, the storage space further stores one or more instructions suitable for being loaded and executed by the processor 1001. The instructions may be one or more computer programs (including program code). It is to be noted that the computer-readable storage medium herein may be a high-speed RAM, or may be a non-volatile memory, such as at least one magnetic disk storage. In some embodiments, the computer storage medium may be at least one computer-readable storage medium far away from the foregoing processor.

In an embodiment, the computer-readable storage medium store one or more instructions; and the processor 1001 loads and executes one or more instructions stored in the computer-readable storage medium, to implement the corresponding steps in the foregoing data processing method embodiments.

According to an aspect of the embodiments of this application, a computer program product or a computer program is further provided, the computer program product or the computer program including computer instructions, the computer instructions being stored in a computer-readable storage medium. A processor of a data processing device reads the computer instructions from the computer-readable storage medium, and executes the computer instructions, to cause the data processing device to perform the foregoing data processing method.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a computer device, comprising:
    acquiring an initial sample angiography image set, the initial sample angiography image set comprising a first sample angiography image corresponding to a first blood vessel at a target site, and a first label of the first sample angiography image, wherein the first label indicates that the first sample angiography image corresponds to the first blood vessel at the target site;
    performing data expansion processing on the first sample angiography image based on physical characteristics of blood vessels at the target site to obtain a processed sample angiography image;
    performing label conversion processing on the first label based on the physical characteristics of the blood vessels at the target site to obtain a second label of the processed sample angiography image; and
    adding the processed sample angiography image and the second label to a target sample angiography image set, the second label indicating that the processed sample angiography image corresponds to a second blood vessel at the target site, wherein a region between the first blood vessel and the second blood vessel satisfies the physical characteristics of the blood vessels at the target site; and
    training an angiography image recognition model using the initial sample angiography image set and the target sample angiography image set to obtain a trained angiography image recognition model, the trained angiography image recognition model identifying a target blood vessel at the target site in an angiography image.

2. The method according to claim 1, wherein the physical characteristics of the blood vessels at the target site comprise a symmetry; and performing data expansion processing on the first sample angiography image comprises:
    forming a mirror image of the first sample angiography image based on the symmetry of the blood vessels at the target site to obtain the processed sample angiography image, wherein the processed sample angiography image is symmetrical to the first sample angiography image.

3. The method according to claim 2, wherein a label of an angiography image is a vector comprising a plurality of elements, each element characterizing a possibility that a respective blood vessel is in the angiography image; and
    in the first label of the first sample angiography image, an element value corresponding to the first blood vessel has a first value, and an element value corresponding to blood vessels other than the first blood vessel has a second element value.

4. The method according to claim 3, wherein performing label conversion processing comprises:
    adjusting the element value corresponding to the first blood vessel in the first label from the first value to the second value; and adjusting the element value corresponding to the second blood vessel in the first label from the second value to the first value; and
    using the adjusted first label as the second label of the processed sample angiography image.

5. The method according to claim 1, wherein the initial sample angiography image set further comprises a second sample angiography image corresponding to a third blood vessel, distinct from the first blood vessel, at the target site, and wherein the physical characteristics of the blood vessels at the target site comprise a fusibility; and
    performing data expansion processing on the first sample angiography image comprises:
    performing fusion processing on the first sample angiography image and the second sample angiography image based on the fusibility to obtain the processed sample angiography image.

6. The method according to claim 5, wherein performing label conversion processing on the first label comprises:
    adjusting the element value corresponding to the third intracranial blood vessel in the first label from a second element to a first element value; and
    setting the adjusted first label as the second label of the processed sample angiography image.

7. The method according to claim 1, wherein training the angiography image recognition model using the initial sample angiography image set and the target sample angiography image set to obtain a trained angiography image recognition model comprises:
    performing recognition processing, using the angiography image recognition model, on a plurality of sample angiography images in the initial sample angiography image set to obtain a first recognition result corresponding to each of the plurality of sample angiography images in the initial sample angiography image set;
    performing recognition processing, using the angiography image recognition model, on a plurality of sample angiography images in the target sample angiography image set to obtain a second recognition result corresponding to each of the plurality of sample angiography images in the target sample angiography image set;
    determining a first loss function of the angiography image recognition model based on a difference between a plurality of the first recognition results and the first labels corresponding sample angiography images, and a difference between a plurality of the second recognition results and the second labels corresponding to sample angiography images; and
    updating parameters of the angiography image recognition model based on the first loss function to train the angiography image recognition model.

8. The method according to claim 7, wherein updating parameters of the angiography image recognition model based on the first loss function comprises:
    acquiring an annotated sample angiography image set comprising a plurality of annotated sample angiography images and corresponding annotation information, the annotation information of the annotated sample angiography image indicating rupture information of a target object in a fourth blood vessel at the target site in the annotated sample angiography image, the rupture information comprising at least one of rupture risk information of the target object and rupture time information of the target object;

performing prediction processing, using the angiography image recognition model, on a plurality of annotated sample angiography images in the annotated sample angiography image set to obtain predicted rupture information of the target object in the plurality of annotated sample angiography images;

determining a second loss function of the angiography image recognition model according to a difference between the predicted rupture information of the target object in each annotated sample angiography image and the annotation information of the annotated sample angiography image; and optimizing the angiography image recognition model based on the first loss function and the second loss function to obtain the trained angiography image recognition model, the trained angiography image recognition model identifying a target blood vessel at the target site in an angiography image and predicting rupture information of a target object in the target blood vessel in the angiography image.

9. The method according to claim 8, wherein optimizing the angiography image recognition model based on the first loss function and the second loss function comprises:

performing weighting processing on the first loss function and the second loss function to obtain a third loss function; and updating the parameters of the angiography image recognition model based on the third loss function.

10. The method according to claim 8, wherein the method further comprises:

acquiring an angiography image to be analyzed; and performing recognition processing, using the trained angiography image recognition model or the target angiography image recognition model, on the angiography image to obtain rupture information of a target object in a target blood vessel at the target site in the angiography image.

11. The method according to claim 1, wherein after performing training on the angiography image recognition model, the method further comprises:

acquiring an annotated sample angiography image set, the annotated sample angiography image set comprising a plurality of annotated sample angiography images having respective associated annotation information, the respective associated annotation information of the annotated sample angiography image indicating rupture information of a target object in a fourth blood vessel at the target site in the annotated sample angiography image, the rupture information comprising at least one of rupture risk information of the target object and rupture time information of the target object; and training the trained angiography image recognition model using the annotated sample angiography image set to obtain a target angiography image recognition model for identifying a target blood vessel at the target site in an angiography image and rupture information of a target object in the target blood vessel.

12. An electronic device, comprising:
one or more processors; and
memory storing one or more programs, the one or more programs comprising instructions that, when executed by the one or more processors, cause the one or more processors to perform operations comprising:
acquiring an initial sample angiography image set, the initial sample angiography image set comprising a first sample angiography image corresponding to a first blood vessel at a target site, and a first label of the first sample angiography image, wherein the first label indicates that the first sample angiography image corresponds to the first blood vessel at the target site;

performing data expansion processing on the first sample angiography image based on physical characteristics of blood vessels at the target site to obtain a processed sample angiography image;

performing label conversion processing on the first label based on the physical characteristics of the blood vessels at the target site to obtain a second label of the processed sample angiography image; and adding the processed sample angiography image and the second label to a target sample angiography image set, the second label indicating that the processed sample angiography image corresponds to a second blood vessel at the target site, wherein a region between the first blood vessel and the second blood vessel satisfies the physical characteristics of the blood vessels at the target site; and training an angiography image recognition model using the initial sample angiography image set and the target sample angiography image set to obtain a trained angiography image recognition model, the trained angiography image recognition model identifying a target blood vessel at the target site in an angiography image.

13. The electronic device according to claim 12, wherein the initial sample angiography image set further comprises a second sample angiography image corresponds to a third blood vessel, distinct from the first blood vessel, at the target site, and wherein the physical characteristics of the blood vessels at the target site comprise a fusibility; and performing data expansion processing on the first sample angiography image comprises:

performing fusion processing on the first sample angiography image and the second sample angiography image based on the fusibility to obtain the processed sample angiography image.

14. The electronic device according to claim 12, wherein the physical characteristics of the blood vessels at the target site comprise a symmetry; and performing data expansion processing on the first sample angiography image comprises:

forming a mirror image of the first sample angiography image based on the symmetry of the blood vessels at the target site to obtain the processed sample angiography image, wherein the processed sample angiography image is symmetrical to the first sample angiography image.

15. The electronic device according to claim 14, wherein a label of an angiography image is a vector comprising a plurality of elements, each element characterizing a possibility that a respective blood vessel is in the angiography image; and in the first label of the first sample angiography image, an element value corresponding to the first blood vessel has a first value, and an element value corresponding to blood vessels other than the first blood vessel has a second element value.

16. The electronic device according to claim 15, wherein performing label conversion processing comprises:

adjusting the element value corresponding to the first blood vessel in the first label from the first value to the second value; and adjusting the element value corresponding to the second blood vessel in the first label from the second value to the first value; and using the adjusted first label as the second label of the processed sample angiography image.

17. A non-transitory computer-readable storage medium, storing a computer program, the computer program, when executed by one or more processors of an electronic device, cause the one or more processors to perform operations comprising:

acquiring an initial sample angiography image set, the initial sample angiography image set comprising a first sample angiography image corresponding to a first blood vessel at a target site, and a first label of the first sample angiography image, wherein the first label indicates that the first sample angiography image corresponds to the first blood vessel at the target site;

performing data expansion processing on the first sample angiography image based on physical characteristics of blood vessels at the target site to obtain a processed sample angiography image;

performing label conversion processing on the first label based on the physical characteristics of the blood vessels at the target site to obtain a second label of the processed sample angiography image; and adding the processed sample angiography image and the second label to a target sample angiography image set, the second label indicating that the processed sample angiography image corresponds to a second blood vessel at the target site, wherein a region between the first blood vessel and the second blood vessel satisfies the physical characteristics of the blood vessels at the target site; and training an angiography image recognition model using the initial sample angiography image set and the target sample angiography image set to obtain a trained angiography image recognition model, the trained angiography image recognition model identifying a target blood vessel at the target site in an angiography image.

18. The non-transitory computer-readable storage medium according to claim 17, wherein the physical characteristics of the blood vessels at the target site comprise a symmetry; and performing data expansion processing on the first sample angiography image comprises:

forming a mirror image of the first sample angiography image based on the symmetry of the blood vessels at the target site to obtain the processed sample angiography image, wherein the processed sample angiography image is symmetrical to the first sample angiography image.

19. The non-transitory computer-readable storage medium according to claim 18, wherein a label of an angiography image is a vector comprising a plurality of elements, each element characterizing a possibility that a respective blood vessel is in the angiography image; and in the first label of the first sample angiography image, an element value corresponding to the first blood vessel has a first value, and an element value corresponding to blood vessels other than the first blood vessel has a second element value.

20. The non-transitory computer-readable storage medium according to claim 19, wherein performing label conversion processing comprises:

adjusting the element value corresponding to the first blood vessel in the first label from the first value to the second value; and adjusting the element value corresponding to the second blood vessel in the first label from the second value to the first value; and using the adjusted first label as the second label of the processed sample angiography image.

* * * * *